INVENTORS:
LOUIS F. CARRIERI
NORTON D. SKINNER
BY: Marzall, Johnston, Cook & Root
ATT'YS Nov. 17, 1970   L. F. CARRIERI ET AL   3,540,081
VERTICAL INJECTION MOLDING MACHINE
Filed Aug. 21, 1967   5 Sheets-Sheet 2

INVENTORS:
LOUIS F. CARRIERI
NORTON D. SKINNER
BY: *Marzall, Johnston, Cook & Root*
ATT'YS

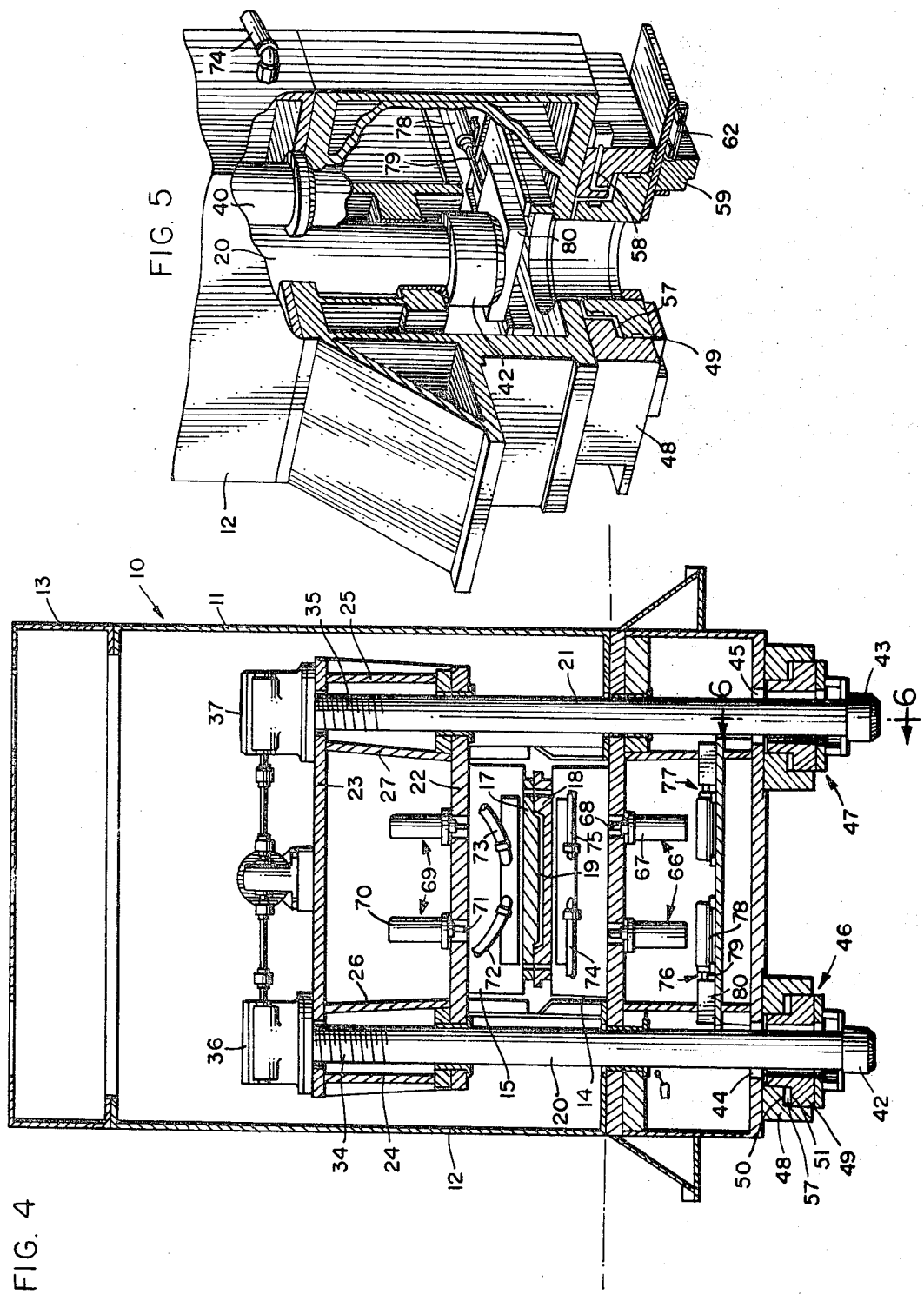

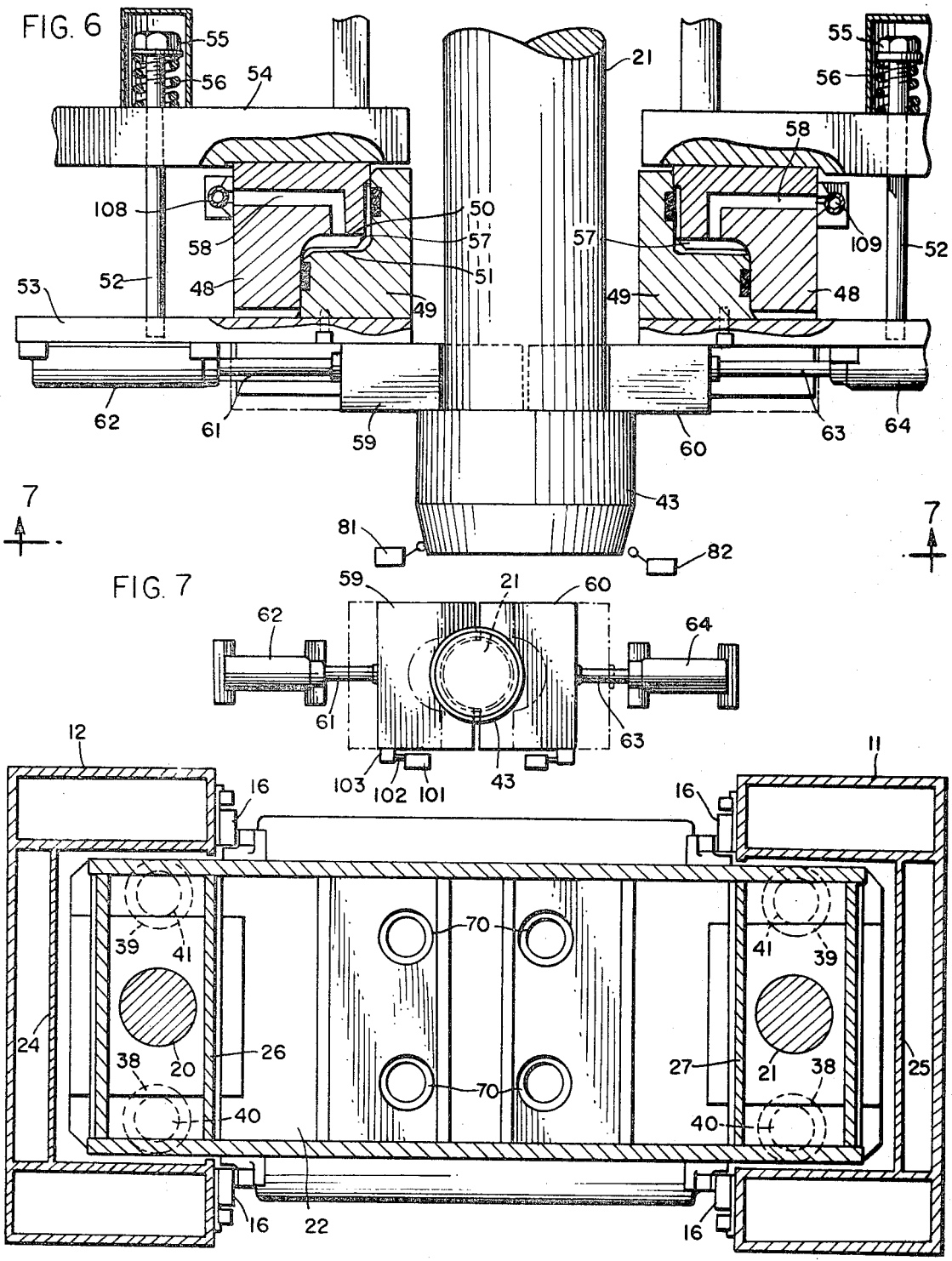

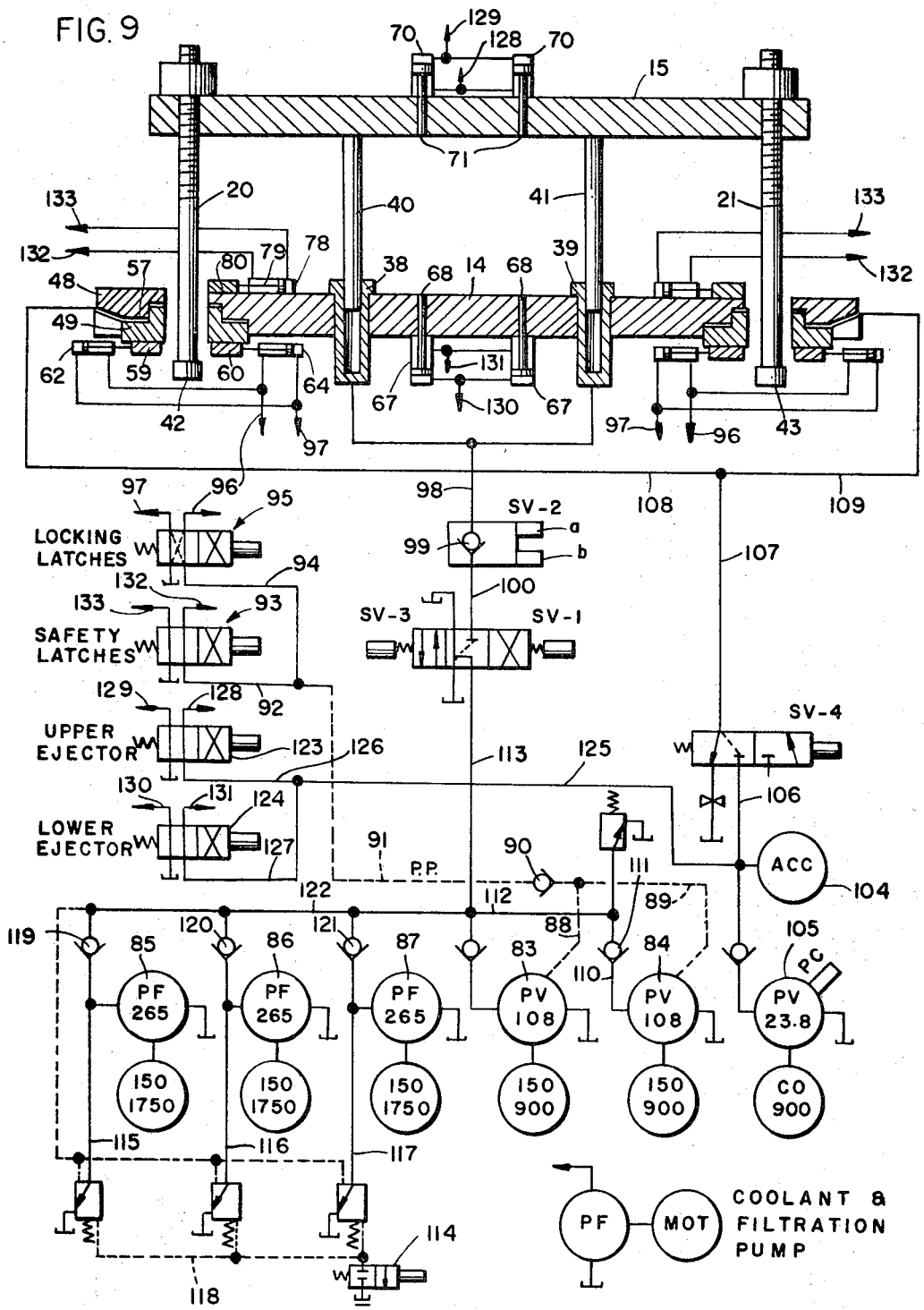

United States Patent Office 3,540,081
Patented Nov. 17, 1970

3,540,081
VERTICAL INJECTION MOLDING MACHINE
Louis F. Carrieri, La Grange Park, and Norton D. Skinner, Palos Heights, Ill., assignors to U.S. Industries, Inc., New York, N.Y., a corporation of Delaware
Filed Aug. 21, 1967, Ser. No. 661,918
Int. Cl. B30b 1/00
U.S. Cl. 18—30   2 Claims

ABSTRACT OF THE DISCLOSURE

A vertical injection molding machine where the upper die member is held in the upper position by hydraulic pressure which allows the die member to move downwardly by gravity when the hydraulic pressure is relieved. Locking means prevents the upper die member from moving upwardly from its lowermost position when hydraulic pressure is exerted to clamp the two die members together during the injection process.

BRIEF SUMMARY OF THE INVENTION

The vertical injection molding machine involving the present invention includes as one of the features thereof a construction which allows the upper die member to move by gravity to the lower die member, thus eliminating any necessity for a positive hydraulic drive from moving the die member downwardly.

Most injection molding machines which inject material in a molten state into a die cavity are horizontal, thereby necessitating movement of the movable die member toward and away from the stationary die member by hydraulic means. Use of hydraulic means to move the die member in both directions necessitates additional hydraulic cylinders which require extremely long machines.

A vertical machine, to accomplish the same purpose, has the advantage of occupying less floor space but has the disadvantage that it requires a greater height than is available at the site of most installations. The fact that a a portion of the machine can be mounted below floor level is advantageous in decreasing the over-all height but if hydraulic means is used to move the die member in both directions, such an arrangement still requires considerable height.

The present arrangement, whereby the movable slide moves by gravity, permits the elimination of hydraulic cylinders which otherwise would be needed to exert hydraulic pressure in a downward direction.

In view of the foregoing it is one of the principal objects of the present invention to provide a vertical injection molding machine which occupies relatively little floor space as well as height compared to either horizontally positioned injection molding machines or other vertical machines heretofore known.

Another object of the invention is to provide a novel arrangement of parts in a vertical injection molding machine whereby the upper die member is moved downwardly into contact with the lower die member by gravity.

A further object of the invention is to provide a novel hydraulic arrangement in an injection molding machine whereby the two die members are tightly clamped together under hydraulic pressure for the required time during the injection of the molten material and for a predetermined period of time thereafter while the material has time to set.

A still further object of the invention is to provide a novel arrangement of locking means in a vertical injection molding machine which acts to lock the upper die member against upward movement away from the stationary die and which is useful as a part of the arrangement which clamps the two dies together.

Still another and more specific object of the invention is to provide a safety latch arrangement which limits any inadvertent downward movement of the upper slide on which the movable die is mounted when in its uppermost position, thereby to prevent possible injury to a workman die area.

Other and more specific objects of the invention will appear more fully hereinafter from the following description taken in conjunction with the accompanying drawings, in which:

FIG. 4 is a view similar to FIG. 2 but showing the upper slide and its associated parts in the lowermost position thereof with the two die members in contact with each other;

FIG. 5 is a fragmentary, enlarged perspective view showing certain operating parts of the machine in section;

FIG. 6 is an enlarged fragmentary, vertical sectional view taken substantially along the plane of line 6—6 of FIG. 4;

FIG. 7 is an under-plan view on a reduced scale illustrating some of the parts shown in FIG. 6;

FIG. 8 is a horizontal, sectional view through the machine taken substantially along the plane of line 8—8 of FIG. 2, and FIG. 9 is a schematic illustration of the hydraulic circuitry for operating the machine in a predetermined sequence.

DETAILED DESCRIPTION

Figure 1:
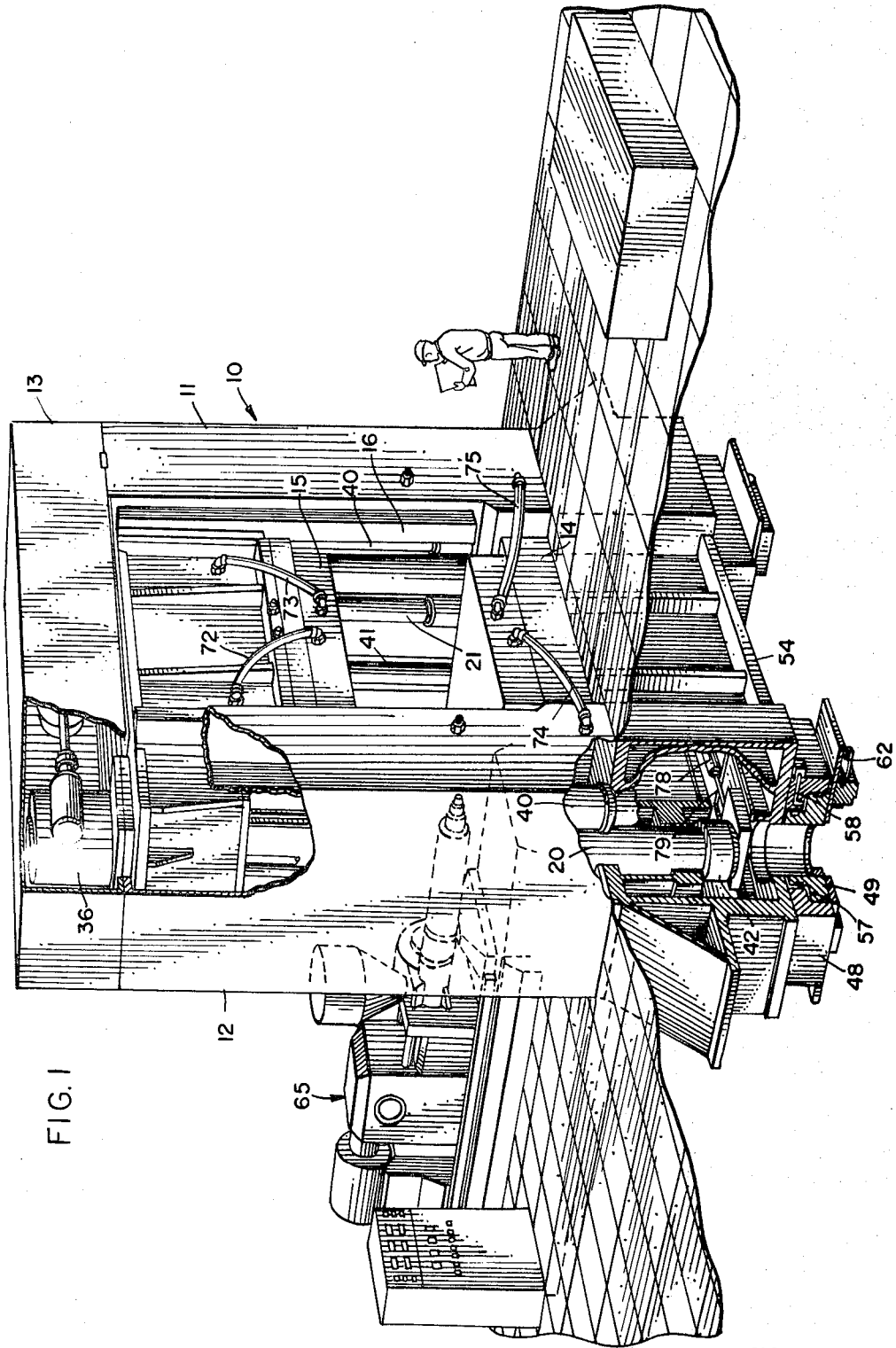
FIG. 1 is a perspective view of a machine embodying the present invention with certain parts thereof broken away and shown in section for the sake of clarity.

Referring now more particularly to the drawings, the machine is generally indicated by the numeral 10 and comprises spaced side frame members 11 and 12 and a crown 13 at the top thereof and spanning the side frame members. Between the frame members, and preferably at floor level, there is provided a bed 14 adapted to have a suitable stationary die member mounted thereon. An upper slide 15 is mounted for vertically reciprocating sliding movement between the side frame members on which an upper movable die member is adapted to be mounted. The upper slide is guided in its reciprocating movement by suitable guide means, such as gibs 16.

Figure 2:
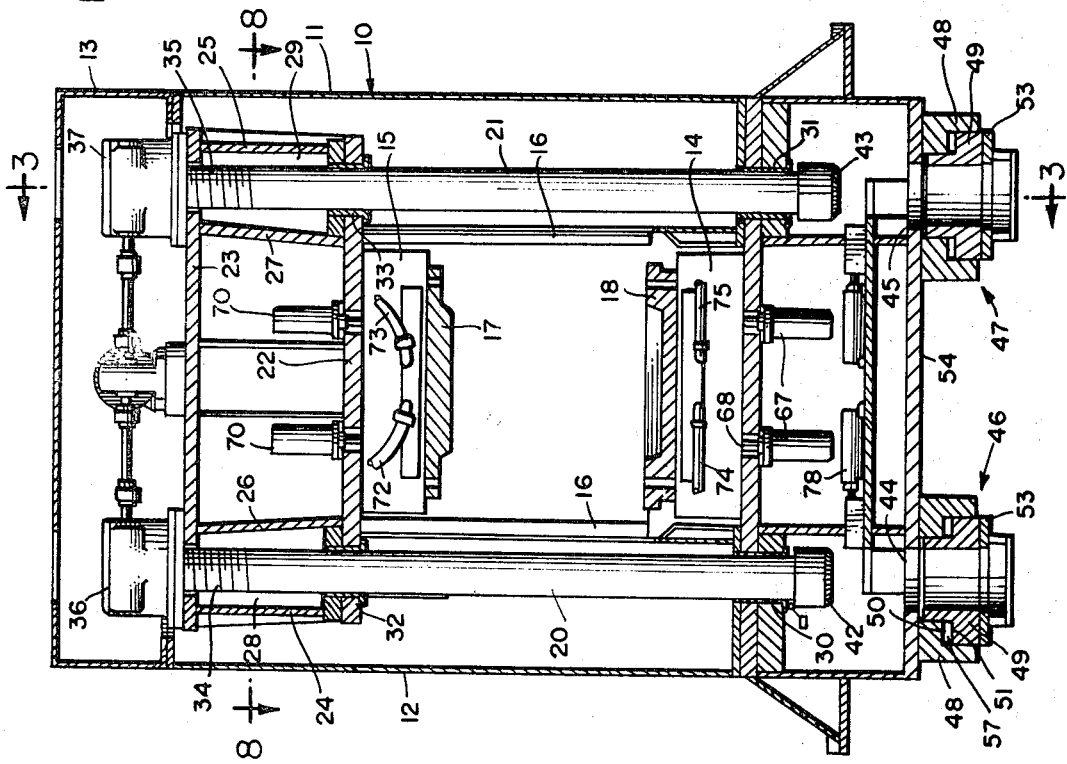
FIG. 2 is a vertical, transverse, sectional view through the machine embodying the present invention and showing two die members separated with the movable die in its uppermost position.

The die members will, of course, assume different configurations and designs, depending upon the size and shape of the part to be molded. For purposes of illustration, there is shown in FIGS. 2 and 4 an upper male die member 17 mounted on the upper slide 15, and a lower stationary female die member 18 mounted on the bed 14. It will be noted in FIG. 4 that when the upper and lower die members 17 and 18 are brought together, there will be a die cavity 19 therebetween into which the molten material is injected.

A plurality of pull rods 20 and 21 are mounted in the side frames 11 and 12 upon which the upper slide 15 is mounted. In the present instance two such pull rods are used, one at each side of the machine.

The upper slide 15 includes a bottom plate member 22, a top plate member 23, and end walls 24 and 25. Inner walls 26 and 27 extend between the upper and lower plates and are spaced inwardly from the end walls 24 and 25, respectively, thereby providing the chambers 28 and 29 at opposite sides of the frame through which the respective pull rods 20 and 21 extend.

The upper slide 15 is aljustably mounted on the pull rods 20 and 21 by threaded engagement therewith so that the slide may be adjusted longitudinally of the pull rods to accommodate dies of different heights. As will appear more fully hereinafter, the upper slide and die mounted thereon reciprocate within the machine frame by the reciprocating motion of the pull rods 20 and 21. The stroke of these rods will always be the same and thus it becomes necessary to adjust the uppermost position of the upper slide for each different set of die members.

Figure 3:
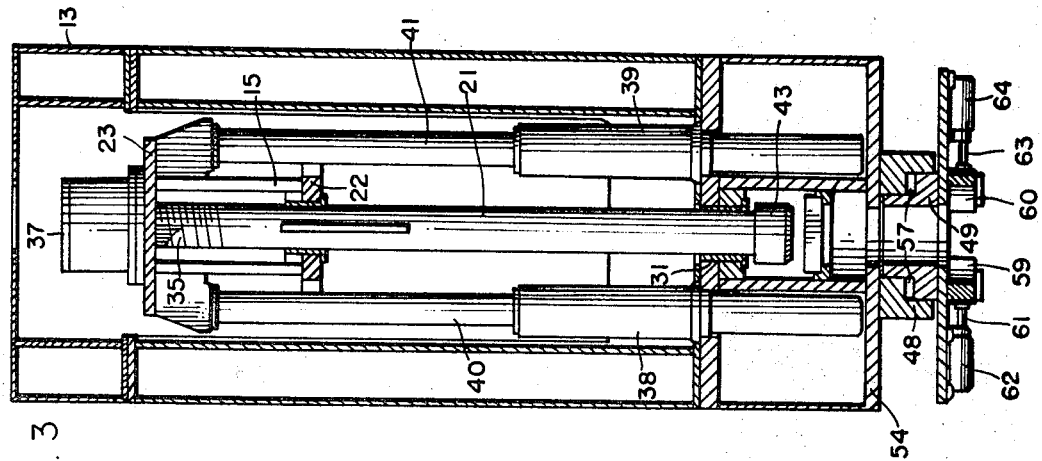
FIG. 3 is a vertical, sectional view through the machine taken substantially along the plane of line 3—3 of FIG. 2.

The pull rods 20 and 21 are guided for axial reciprocation through the bearing members 30 and 31 located near the bottom of the machine frame, as may be seen in FIGS. 2, 3 and 4. Bearing members 32 and 33 are provided in the upper slide member 15 through which the pull rods pass and by means of which the upper slide is guided in its reciprocating movement along the length of the pull rods when the position with respect thereto is being adjusted.

The upper ends of the pull rods 20 and 21 are threaded as may be seen at 34 and 35, respectively, and extend upwardly into housings 36 and 37. Within these housings there are located suitable means which may be operated to adjust the slide 15 axially along the pull rods. The means by which this may be accomplished forms no part of the present invention but may, if desired, be similar to the slide adjusting mechanism shown, for example, in the Bannon Pat. No. 2,884,885 issued May 5, 1959. Bevel gears are mounted on the upper slide and are internally threaded to engage with those on the upper ends of the rods. Drive means cause the bevel gears to rotate with respect to the pull rods so that the threads thereon will cause the gears to move axially of the rods. Since these bevel gears are mounted on the upper slide, such slide will also thereby be adjusted axially of the pull rods.

One of the features of the invention is the hydraulic arrangement whereby, instead of providing positive means for driving the upper slide and die member downwardly toward the stationary die, such movement of the slide and die occurs by gravity. The upper slide is maintained in its upper position by hydraulic pressure through suitable lift cylinders. When the hydraulic fluid in the cylinders is vented to tank, the weight of the slide will cause the slide and pull rods to drift downwardly. In the present embodiment, two such lift cylinders are provided at each side of the machine frame, one on each side of one pull rod. In FIG. 3, for example, where the pull rod 21 is shown, the hydraulic lift cylinders on each side thereof are indicated by the numerals 38 and 39, respectively. Each cylinder has a piston rod associated therewith as shown, for example, at 40 and 41. There will be four such rods, the upper ends of which are secured in a suitable manner to the upper slide 15.

Thus, hydraulic fluid under pressure entering the cylinders 38 and 39 will force the rods 40 and 41, together with the slide and die mounted thereon, in an upward direaction. This movement of the slide carries with it the two pull rods 20 and 21. The cylinder 38 and 39, at the appropriate time in the cycle of operation, will be opened to the hydraulic tank, whereupon the weight of the slide will cause such slide, together with the piston rods 40 and 41, the pull rods 20 and 21, and the die 17, to move downwardly. This motion continues until the upper die comes into contact with the lower die 18 as shown in FIG. 4.

It will be noted that the lower end of each of the pull rods 20 and 21 is provided with an enlarged portion or collar 42 and 43, respectively. The base of the machine is provided with openings 44 and 45 through which the pull rods 20 and 21, respectively, are adapted to pass during their downward movement with the upper slide. Immediately below each of these openings is a clamp cylinder which operates to clamp the two die members tightly together during the injection process. These clamp cylinders are indicated generally by the numerals 46 and 47. Each clamp cylinder is comprised of an outer annular ring 48 and an inner ring 49. The outer ring 48 has a downwardly facing shoulder 50 (see especially FIG. 6) and the inner ring 49 has an upwardly facing shoulder 51. When the machine is not operating or when the upper slide is in the upper position thereof, the space between these shoulders 50 and 51 normally is closed by any suitable means which will urge the inner ring 49 in an upward direction. One manner in which this may be accomplished is to provide a plurality of rods 52 secured to the lower plate 53, which rod extends upwardly through the base plate 54 and which has a shoulder or nut 55 on the outer end thereof. A spring 56 may bear at one end against the base member 54 and at its other end against the nut 55, thereby to urge the bottom plate 53 and the inner ring 49 upwardly.

These clamping cylinders 46 and 47 just described will provide an annular cavity 57 between the inner and outer rings 49 and 48, respectively, into which hydraulic fluid under pressure will be forced in order to clamp the upper and lower die members together. As may be seen in FIG. 6 for example, the outer ring 48 may have a plurality of passages 58 therethrough, each of which communicates at one end thereof with a source of fluid under pressure, and the other end of which communicates with the cavity 57.

An additional feature of the invention is the provision of the locking latches through which pressure is exerted downwardly to force the pull rods 20 and 21 in a downward direction for the purpose of clamping the upper die member against the lower die member. These locking latches may be seen in FIGS. 3, 6 and 7. While these latches may assume any desired specific form, they have been shown herein as consisting of a pair of latch members 59 and 60, each of which has an arcuate recess to receive a portion of its associated pull rod. These latch members are mounted for reciprocating movement toward and away from each other, preferably by hydraulic means.

In the embodiment shown, the latch member 59 has secured thereto a rod 61 associated with a cylinder 62 mounted on the underside of the bottom plate 53. Likewise, the latch member 60 has secured thereto a similar rod 63 associated with a cylinder 64 also mounted on the underside of the bottom plate 53.

At the proper moment in the machine cycle when the upper slide and die member mounted thereon have moved downwardly into contact with the lower die member, hydraulic fluid entering the cylinders 62 and 64 will move the latch members 59 and 60 toward each other to their full line latching position shown in FIGS. 6 and 7. Each member will then overlie the upper edge of the collar 42 and collar 43 on the lower end of the pull rods. It will be evident that the number of such latch members may vary depending upon individual choice.

After the upper die member has contacted the lower die member in the position shown in FIG. 4, and the hydraulic fluid has actuated the latch members 59 and 60 by moving them to their full line latching position shown in FIGS. 6 and 7, fluid under pressure is then forced into the annular cavity 57 of each clamping cylinder 46 and 47. The pressure of this fluid will exert a downward force on each inner ring 49, bottom plate 53, locking latch members 59 and 60, which force is then transmitted to each pull rod 20 and 21 through the respective collars 42 and 43. This in turn will exert a downward pull on the upper slide 15 and the upper die member 17, thereby firmly clamping it against the lower die 18. At the same time, the hydraulic fluid in the clamping cylinders will exert an upward force on the outer rings 48 which will be transmitted through the press bed 14 to the lower die 18, thereby to enhance the clamping pressure between the two die members. This will insure that the two die members will be tightly sealed when injection of the molten material into the die cavity 19 occurs.

The injection step may be provided by any suitable apparatus which forms no part of the present invention. FIG. 1, however, illustrates in general an injection apparatus 65 adapted to contain a quantity of a suitable molding material in a molten state. This apparatus is suitably connected by well known means to the stationary die member 18 with passages there-through leading to the die cavity 19. When the machine parts are in position as above described with the two die members tightly clamped together, the molten material is injected by the apparatus 65 into the mold cavity 19.

The machine parts remain in this position until the work cycle is complete and the mold has substantially set. At this time a signal is given which decompresses the main clamp cylinders 46 and 47 which allows the annular cavity 57 therein to become closed in preparation for the next cycle. The locking latches are retracted and certain solenoid valves, as will appear hereinafter, will be energized to actuate high pressure, low volume pumps. Thus, hydraulic fluid is pumped under high pressure but low volume into the lift cylinders 38 and 39 which cause the upper slide and die member attached thereto to move upwardly at a slow speed for stripping.

A plurality of ejectors are provided for ejecting the molded product from the dies. Depending upon the die design, the final product may tend to cling either to the lower or upper die or both.

For this purpose, a plurality of bed ejectors generally indicated at 66 are provided, each of which consists of a hydraulic cylinder 67 and ejector pins 68 adapted to move upwardly through the lower die member by hydraulic pressure to strip the product from the die.

Also, a plurality of slide ejectors generally indicated at 69, are provided, each of which consists of a hydraulic cylinder 70 and an ejector pin 71. Fluid pressure in the cylinder 70 will move the ejector pin 71 downwardly through the upper die member and strip the product therefrom in the event it tends to cling thereto.

Adjustable limit switches are provided to be actuated at any desirable point during the return stroke of the slide which will actuate the ejector pins at a predetermined time, depending upon the die design.

As will also appear hereinafter when reference is made to the hydraulic circuit upon completion of the stripping phase, the upper slide will trip an adjustable limit switch to actuate one or more low pressure, high volume pumps for the purpose of returning the slide to its uppermost position at a rapid return speed. Thus, the slide is moved upwardly at a relatively slow rate of speed until the stripping phase is complete, whereupon the slide moves at an increased rate of speed for the completion of its return stroke. The return movement of the upper slide is terminated by the actuation of a top limit switch which is actuated by the slide when it reaches its upper position.

It will be noted from viewing FIGS. 1, 2 and 4 that suitable cooling means are provided for the dies. For example, conduits 72 and 73 are connected to the upper slide 15 and are adapted to have a coolant flow therethrough. Likewise, conduits 74 and 75 are connected to the bed 14 and are adapted to have coolant flow therethrough. This is in accordance with known practices and need not be elaborated upon here.

An additional feature of the invention involves the provision of safety latches which prevent the lowering of the upper slide inadvertently while a workman may be within the press frame repairing it or performing other services. Being hydraulically operated, there is always a possibility of a leak in the hydraulic line or a failure or reduction of pressure. Since the upper slide is held in its uppermost position under hydraulic pressure, any reduction in such pressure would allow the slide to move or creep downwardly by gravity. As a safety feature, therefore, a pair of safety latches generally indicated by the numerals 76 and 77 are provided. Each safety latch consists of a hydraulic cylinder 78 mounted within the framework of the bed at a location slightly below the lower ends of the pull rods 20 and 21 when they are in their uppermost position. Each cylinder 78 is provided with a piston rod 79 connected at its outer end to a plate or safety latch member 80. When the slide and pull rods are in the uppermost position thereof, as shown for example in FIGS. 2 and 3, and when the machine is not operating or is idle, hydraulic fluid under pressure may be forced into the cylinder 78 thereby to force the safety latches 80 outwardly to a position below the lower ends of the pull rods.

These safety latches then act as stop means so that in the event of line leakage or pressure reduction in the hydraulic pressure in the lift cylinders, causing or permitting the upper slide and pull rods to creep downwardly, such movement will be limited by the safety latches. The lower ends of the pull rods will come against these safety latches, thereupon to prevent any more than a small limited downward movement of the upper slide. Thus, when dies are being installed or when a workman is within the press frame, any tendency of the upper slide to creep downwardly is limited by the position of the safety latches, thus preventing any harm or injury to any such workman.

A further feature of the invention resides in the provision of limit switches adapted to be contacted by the pull rods or the collars 42 or 43 thereon in the lower position thereof. As indicated above, the stroke of the pull rods and the upper slide must be the same at all times. That is to say, the pull rods must always move downwardly to a position immediately below and closely adjacent the locking latches 59 and 60 so that when the application of hydraulic pressure in the clamp cylinders forces the locking latches downwardly, they will come against the shoulder provided by the upper surface of the collars on the pull rods.

The height of the dies within the press will vary, depending upon the final product being molded. Actuation of the slide adjusting mechanism, as described briefly hereinabove, will adjust the position of the slide longitudinally of the pull rods. As an example, the pull rods and slide may have a 72 inch stroke between the uppermost and lowermost positions thereof. This stroke will always be the same. The die height, however, will change depending upon the depth of the final product being molded. There may then be, for example, 24 inches of adjustment between the maximum and minimum distances between the upper slide and bed. For die members of relatively great depth or height, the upper slide should be adjusted along the length of the pull rods to its greatest elevation thereon. If the die members are relatively shallow, then the upper slide must be moved downwardly with respect to the pull rods because a 72 inch stroke with the upper slide in its uppermost position on the rods would cause the pull rods to lower excessively when the dies close. In order for the shallow dies to close without excessive lowering of the pull rods, the upper slide must be adjusted downwardly along the pull rods so that movement thereof toward the lower die for a distance of approximately 72 inches will cause the die members to close.

This adjustment, as mentioned above, is accomplished by suitable drive means rotating bevel gears mounted on the upper slide and threadedly engaging the threads on the upper ends of the pull rods 20 and 21.

With the foregoing in mind, reference is made to FIG. 6 where the two limit switches 81 and 82 are shown adjacent the collar 43 on the lower end of pull rod 21. These switches come into play upon the changing of dies. If it is assumed that the position of the upper slide on the pull rods is proper for a relatively shallow die, then it will be in a relatively low position with respect to the top of the pull rods. If, then, dies of greater height are to be mounted on the upper slide and bed, then the upper slide will have to be adjusted upwardly on the pull rods. This distance may be approximated initially but since the lower ends of the pull rods are always below floor level, as may be seen in FIG. 1, the position thereof with respect to the locking latches cannot be determined visually.

The two switches 81 and 82 are intended to automatically adjust the proper position of the upper slide along the length of the pull rods for a given die height. With the higher dies in place, if the upper slide has not been adjusted upwardly with respect to the pull rods a sufficient distance, the two die members may come together before the collars on the lower ends of the pull rods have reached the position below the locking latches. When this occurs, the adjusting mechanism in the crown of the press may be operated by manually closing a switch to actuate such drive mechanism so that it will in effect raise the upper slide with respect to the pull rods, which will result in the pull rods moving downwardly if the two die members are in contact with each other.

With the adjusting mechanism in operation and the pull rods moving downwardly, the lower end thereof will actuate the limit switch 81 which signals that the collars on the pull rods are in proper position below the locking latches, whereupon the adjusting mechanism will promptly cease further operation. From then on, the machine will operate in the normal way, as described above, for cycling.

The other limit switch 82 operates when a reverse situation occurs. In this instance the slide is already in a relatively high position with respect to the pull rods to accommodate dies of greater height. When these dies are removed and shallower dies are mounted on the slide and bed, the upper slide will have to be moved to a lower position with respect to the pull rods so that it will contact the lower die when the lower ends of the pull rods in their proper positions for the locking latches to be effective.

With the shallower dies in place, the adjusting mechanism may be operated by manual operation of switches to lower the slide with respect thereto. Again, however, when the slide is allowed to move downwardly to the lower die, it may be that the slide is still too high on the pull rods so that the lower ends thereof will move downwardly through a distance below the locking latches greater than is desirable. As soon as the lower end of the pull rod moves downwardly too far, it will actuate the limit switch 82 which thereupon begins operation of the adjusting mechanism to rotate the adjustment gearing in a direction which will cause the slide to move downwardly with respect thereto. Thus, when the upper and lower die members meet, continued rotation of the adjustment gearing will then cause an upward axial movement of the rods until the switch 82 is deactivated.

In brief summary, therefore, if the die members are of such height that when they close, the lower ends of the pull rods have not moved down the proper distance, then it is necessary to manually activate the adjusting mechanism. This lowers the pull rods until they activate the switch 81, thereupon stopping further operation of the adjusting mechanism.

On the other hand, if the pull rods move downwardly a greater distance than they are supposed to move before the two die members come together, switch 82 will become activated to operate the adjusting mechanism to move the pull rods upwardly with respect to the slide until the two die members meet.

Referring now to FIG. 9, the schematic hydraulic circuit shown therein will briefly be described so that the cycling of the machine and the sequence of operation for each cycle may be understood.

It will be evident, of course, that the particular hydraulic circuit shown herein is illustrative only and can be varied to suit individual conditions. As shown, the hydraulic system has a plurality of high pressure-low volume pumps, two of which are shown herein and indicated by the numerals 83 and 84 and are of the variable flow type. Also provided is a plurality of high volume-low pressure pumps, three of which are shown at 85, 86 and 87 which are of the fixed flow type. As will be presently explained, after the injection period has been completed and the molded part substantially set, the upper slide will move upwardly at a comparatively slow rate of speed for a few inches to separate the die members, after which time the slide and upper die move upwardly at an increased rate of speed. The pumps 83 and 84 act to move the slide slowly at first and thereafter the pumps 85, 86 and 87 will join the other two pumps to impart a rapid rising movement to the slide.

Conduits 88 and 89 leading from the pumps 83 and 84 are shown in FIG. 9 in dotted lines. These conduits join so that under pressure the check valve 90 will open and pilot pressure will then be furnished through the conduit 91 to the safety latches and the locking latches. A branch 92 of the line 91 carries hydraulic fluid to the solenoid valve 93 while a second branch 94 carries the pilot pressure to the solenoid valve 95.

In the inoperative position of the machine with the slide in its uppermost position, the hydraulic line 96 emerging from the valve 95 will be connected to the rod side of each of the cylinders 62 and 64, thereby to hold the locking latches 59 and 60 in their retracted position. The line 97, which is connected with the head side of the cylinders 62 and 64, will be opened to tank, as shown schematically in FIG. 9.

Also, in this position of the slide hydraulic pressure in the lift cylinders 38 and 39 will hold the slide in its top position. The solenoid valve indicated at SV–1 will be in a neutral position and the valve SV–2 will be deenergized. When the switch is activated for the purpose of allowing the upper slide to move downwardly to the lower die member, valve SV–1 will be shifted to vent the lift cylinders 38 and 39 to tank. The weight of the slide will then allow it to move downwardly and force the fluid out of the lift cylinders through conduit 98 and through the value SV–2. In this direction of flow, the valve is such that the check valve 99 therein will be bypassed and preferably there will be two openings in the valve SV–2 adapted to be closed or opened by the solenoids $a$ and $b$ in the valve SV–2. It is desirable that the slide move downwardly at a rapid rate of speed until it approaches fairly closely to the lower die member, at which time it is desirable that the slide move slower until it comes against the lower die.

There may be numerous specific ways in which this result can be accomplished but, for purposes of illustration, the valve SV–2 is designed with two variable openings therein. Both of these will be open as the slide moves downwardly at a rapid rate of speed. A suitable limit switch will be activated when the slide reaches a predetermined distance from the lower die, at which time one of the solenoids SV–2$a$ or $b$ will be energized to close one of the openings, thereby restricting further flow of fluid through the valve. This will slow down the speed of movement of the slide until the two die members come into contact.

Energizing valve SV–1 will direct outward flow of fluid from SV–2 through conduit 100 to tank.

When the slide has reached its lowermost position where the upper die is in contact with the lower die member, a suitable limit switch is activated for closing the locking latches 59 and 60. This may be accomplished by suitable electrical circuitry involving the switch 81, heretofore referred to, or if desired, a separate switch may be utilized for this purpose. When the slide reaches its lowermost position, solenoid valve 95 will be shifted so that the pilot pressure through conduit 94 will then enter the conduit 97 which directs the fluid to the head side of the cylinders 62 and 64. At the same time conduit 96 connected with the rod side of these cylinders will be vented to tank, whereupon the locking latches 59 and 60 will be caused to move toward each other into latching position, as shown for example, in FIGS. 6 and 7.

When the locking latches reach latching position, suitable switches may be activated to energize solenoid valve SV–4 to put accumulator volume of hydraulic fluid into the clamp cylinders, as heretofore mentioned. Again, any suitable limit switches may be used for this purpose, but for purposes of illustration FIG. 7 shows a pair of switches 101 provided with a blade or plunger 102 against which a stop member 103 mounted on the latching members 59 and 60 may be moved when the latching members are in closed position. When the latching members are closed, then, these limit switches 101 will energize solenoid SV–4, whereupon hydraulic fluid from the accumulator 104 will be pumped by the pressure compensating pump 105 through conduits 106 and 107 to the branch lines 108 and 109 and thence to the passageways 58 leading to the clamp cylinder (see FIG. 6). As mentioned heretofore, this step places a predetermined pressure between the upper and lower die members prior to the injection step.

When the predetermined pressure in the clamp cylinder has been reached, a high pressure-pressure switch (not shown) may be activated to initiate the injection and cooling period. After the injection has taken place and the molten material has substantially set, the completion of the machine cycle will proceed. This includes decompression of the main clamp cylinders, retraction of the locking latches, elevation of the slide, and stripping by means of the ejector pins. At a suitable time when the molten material in the die cavity is substantially set, the solenoid valve SV–4 is deenergized to the position shown in FIG. 9 which thereupon relieves the pressure in the cavity of the clamp cylinder 57 and the lines 108, 109 and 107 will be vented through a controlled opening back to tank.

A low pressure-pressure switch will be activated by the pressure drop in the clamp cylinder to deenergize the latching solenoid 95. This will operate the valve back to the position shown in FIG. 9 wherein pilot pressure from the pumps 83 and 84 will force fluid through conduit 96 to the rod side of the cylinders 62 and 64. The head side of these cylinders will be open to tank through conduits 97, whereupon the locking latches 59 and 60 will be retracted.

Solenoid valve SV–1 will be deenergized and SV–3 will be energized upon deactivation of the limit switches 101 by retraction of the locking latches, whereupon high pressure and low volume hydraulic fluid will be pumped from the pumps 83 and 84 through conduit 110 to open check valve 111. This high pressure and low volume hydraulic fluid will then pass through conduits 112 and 113 and will pass through to the conduit 100 against check valve 99 and into the lift cylinders 38 and 39 through line 98.

This action will initiate upward movement of the slide and upper die at a relatively slow speed. After the molded part has become free of the die members, a suitable limit switch will be actuated, such as by movement of the pull rods, to energize the solenoid valve 114 shown in FIG. 9. Up to this point the pumps 85, 86 and 87 have been pumping a fixed volume under low pressure through the lines 115, 116 and 117 to a conduit 118 through the valve 114 to tank. Energization of the valve 114 will cause the flow of hydraulic fluid to reverse itself, opening the respective check valves 119, 120 and 121, whereupon the fluid will flow through line 122 and join the fluid flow from pumps 83 and 84 in the conduit 113. When this occurs, the rise of the upper slide will rapidly increase so that it will have a relatively fast rate of speed in the remainder of its upward movement to the uppermost position thereof.

At some suitable time during the separation of the two die members, either the upper or lower ejectors will be actuated. As mentioned above, this may take place at any time during the upward movement of the slide. Also, the die design will determine whether the upper or lower ejectors will be actuated. Some die designs result in the molded parts tending to stick to the lower die, while other designs tend to make it stick to the upper die. To which die member the molded part will tend to stick may be determined in advance so that it will be known which of the ejectors are to be actuated.

The solenoid valve for the upper ejector is indicated at 123 and the solenoid valve for operating the lower ejector is indicated at 124. The hydraulic fluid from the pressure compensating pump 105, after the decompression of the clamp cylinders, will be directed through line 125 which branches off into the lines 126 and 127. Line 126 carries the fluid through the valve 123 to line 128 which, as may be seen in the upper part of FIG. 9, forces the fluid into the rod end of each of the upper ejector cylinders 70. If the die design is such as to make the molded part stick to the upper die member, then a suitable switch will energize the solenoid valve 123 to shift the valve so that line 128 will be vented to tank while the fluid under pressure is caused to flow through line 129 into the head end of each cylinder 70. This causes the upper ejectors to move downwardly and strip the molded part from the upper die. After this operation has been completed, the solenoid valve 123 will be deenergized to move the parts back into the position shown in FIG. 9, opening the line 129 to tank and forcing fluid through line 128 to return the ejector members to their upper position.

If on the other hand the die design is such as to tend to make the molded part stick to the lower die, then solenoid valve 124 will be energized to shift the valve so that the fluid will flow therefrom through conduit 130 to the head end of ejector cylinders 67. This shifting of the valve then opens line 131 from the rod end of these cylinders 67 back to tank so that the ejectors 68 will move upwardly to strip the molded part from the lower die. When this has been accomplished, solenoid valve 124 will be deenergized and move back to its position shown in FIG. 9, whereupon fluid under pressure flows through line 131 to the rod side of cylinders 67 to reverse the movement of the ejectors. In this position line 130 will be open to tank.

The machine designed to operate in the foregoing manner has numerous advantages over those heretofore known. For example, it will be noted that all hydraulic connections are stationary except those to the upper ejectors. It is, therefore, unnecessary to provide the conduits with movable joints which would increase the tendency toward leakage. Leakage in the entire hydraulic system is thereby minimized.

The absence of any hydraulic pressure from above allows the entire system to be positioned in the lower part of the machine, with the exception of the upper ejectors. Thus, in the event that there is some leakage of hydraulic fluid, it will not leak into the molds. This is a very troublesome problem in ejection molding machines heretofore known.

The fact that the downward movement of the upper slide is achieved merely by its own weight and without the need for any positive pressure from above, is also a great advantage from the standpoint that it eliminates any large prefill lines or prefill tanks in the crown of the press. Furthermore, all of the hydraulic action is by positive pressure as distinguished from negative pressure or vacuum necessary in other hydraulically operated molding machines.

As mentioned heretofore, when the slide is in its uppermost position and a workman is within the machine frame performing repair services or changing dies, the safety latches 80 are moved into place below the lower ends of the pull rods 20 and 21. These safety latches are actuated by energizing the solenoid valve 93. In normal operation of the machine, the pilot pressure from pumps 83 and 84 forces fluid through conduit 92 to the valve 93 and to the rod side of each cylinder 78 through the line 132. The line 133 from the head end of cylinders 78 will be open to tank through valve 93. When the safety latches are to be utilized by moving them to a position below the pull rods, solenoid valve 93 will be energized to shift the valve so that hydraulic pressure then is carried from conduit 92 through line 133 to the head end of the cylinders 78. The other line 132 is open to tank, whereupon the safety latches 80 will move to a position under the pull rods.

In the event of leakage, the slide may creep down to the point where the lower ends of the pull rods come against the safety latches 80. There will be, however, only the weight of the slide on these safety latches when the slide reaches this point. This fact emphasizes a further advantage in the present design of machine as distinguished from those wherein a positive fluid pressure forces the slide downwardly, because in such cases a switch could be inadvertently activated to move the slide downwardly by a tremendous positive pressure. Such pressure conceivably would be sufficient to break the safety latches, thereby causing injury to a workman within the machine frame.

A still further advantage of the present design lies in the fact that injury to the die parts or mold cannot take place. In the normal hydraulic press where positive pressure is exterted to move the upper die downwardly against the lower die, damage to the die or mold would take place if articles, such as a tool or wrench, should inadvertently be left in the die. If this should occur in a regular hydraulic press, the die members would be damaged and conceivably the entire machine frame bent out of line.

As distinguished from this, the present machine design prevents any high pressure or high tonnage between the die members until the pull rods have reached their proper position so that the locking latches can be moved into latching position. If a tool, for example, has been left in the die, the lower ends of the pull rods cannot be moved downwardly a sufficient distance to permit the locking latches to move into latching position. Since the high pressure in the main clamp cylinder cannot take place until the locking latches are completely closed, this results in an added advantage of the machine design.

The positioning of the pull rods and lift cylinders at opposite sides of the machine leaves the front and back of the machine frame completely open so that access to the interior thereof may be had, which also allows for proper locations of ejectors for a given die configuration.

Changes may be made in the form, construction and arrangement of parts from those disclosed herein without in any way departing from the spirit of the invention or sacrificing any of the attendant advantages thereof, provided, however, that such changes fall within the scope of the claims appended hereto.

The invention is hereby claimed as follows:
1. A vertical injection molding machine comprising:
 (a) an upper slide adapted to have an upper die member thereon,
 (b) a plurality of pull rods mounted for vertical sliding movement between upper and lower positions and on which said upper slide is adjustably mounted.
 (c) a plurality of lift cylinders having pistons therein attached to said upper slide and adapted to elevate said slide to the upper position thereof under hydraulic pressure,
 (d) a bed adapted to have a lower die member mounted thereon to cooperate with the upper die member when said slide is in the lower position thereof to form a die cavity therebetween into which a fluid moldable substance may be injected,
 (e) means to relieve the hydraulic pressure in said lift cylinders when said slide is in the upper position thereof, thereby permitting said slide and the upper die member thereon to move to the lowermost position thereof by gravity,
 (f) means cooperating with said pull rods in the lower position thereof to lock said pull rods, slide, and upper die member in said lower position,
 (g) adjusting means for adjusting said pull rods and slide with respect to each other, whereby the lower ends of said pull rods may always be located in substantially the same position when the two die members are in contact with each other, and
 (h) safety latch means movable into the path of downward movement of said pull rods, thereby to limit inadvertent downward movement of said slide.

2. A vertical injection molding machine comprising:
 (a) an upper slide adapted to have an upper die member mounted thereon,
 (b) a plurality of pull rods mounted for vertical sliding movement between upper and lower position on which said upper slide is adjustably mounted,
 (c) a plurality of lift cylinders having pistons therein attached to said upper slide and adapted to elevate said slide to the upper position thereof under hydraulic pressure,
 (d) a bed adapted to have a lower die member mounted thereon to cooperate with the upper die member when said slide is in the lower position thereof to form a die cavity therebetween into which a fluid moldable substance may be injected,
 (e) means to relieve the hydraulic pressure in said lift cylinders when said slide is in the upper position thereof, thereby permitting said slide and the upper die member thereon to move to the lowermost position thereof by gravity,
 (f) a collar on each said pull rod providing an upwardly facing shoulder thereon,
 (g) locking means adapted to cooperate with said shoulder when said pull rods are in the lower position thereof to lock said pull rods, slide, and upper die member in the lower position thereof,
 (h) adjusting means for adjusting said pull rods and slide with respect to each other whereby the lower ends of said pull rods may always be located in substantially the same predetermined position with respect to said locking means when the two die members are in contact with each other, and
 (i) limit switches adapted to be activated by movement of said pull rods downwardly, one of said switches being operable to stop operation of said adjusting means when said pull rods have been moved downwardly with respect to said slide to said position, and the other of said switches being operable to actuate said adjusting means to move said pull rods upwardly with respect to said slide to said position.

References Cited
UNITED STATES PATENTS

| | | | |
|---|---|---|---|
| 2,356,634 | 8/1944 | Von Opel | 18—30 |
| 2,916,768 | 12/1959 | Queré et al. | 18—30 |
| 2,976,569 | 3/1961 | Queré et al. | 18—30 |
| 3,093,863 | 6/1963 | Ehlert | 18—30 |
| 3,191,235 | 6/1965 | Rougement | 18—43 |
| 3,270,372 | 9/1966 | Hesse | 18—30 |
| 3,346,924 | 10/1967 | Lombard | 18—30 |
| 3,394,434 | 7/1968 | Hart-Still | 18—30 |
| 3,433,290 | 3/1969 | Eggenberger | 18—30 |

J. SPENCER OVERHOLSER, Primary Examiner

M. O. SUTTON, Assistant Examiner

U.S. Cl. X.R.

18—16